(12) United States Patent
Jensen et al.

(10) Patent No.: US 8,401,675 B2
(45) Date of Patent: Mar. 19, 2013

(54) METHODS AND SYSTEMS FOR MACHINE-RELATED INFORMATION DELIVERY

(75) Inventors: Brad E. Jensen, West Jordan, UT (US); Shane W. Lawrence, East Sp. Fork, UT (US)

(73) Assignee: Intellischematic, LLC, Alpine, UT (US)

( * ) Notice: Subject to any disclaimer, the term of this patent is extended or adjusted under 35 U.S.C. 154(b) by 1032 days.

(21) Appl. No.: 11/611,698

(22) Filed: Dec. 15, 2006

(65) Prior Publication Data

US 2007/0156266 A1 Jul. 5, 2007

Related U.S. Application Data

(60) Provisional application No. 60/750,471, filed on Dec. 16, 2005.

(51) Int. Cl.
*G05B 11/01* (2006.01)
(52) U.S. Cl. .......................... 700/17; 700/83
(58) Field of Classification Search .................. 700/17, 700/83; 434/379
See application file for complete search history.

(56) References Cited

U.S. PATENT DOCUMENTS

| | | | | |
|---|---|---|---|---|
| 5,970,437 A | * | 10/1999 | Gorman et al. | 702/184 |
| 6,025,844 A | * | 2/2000 | Parsons | 715/805 |
| 6,275,741 B1 | * | 8/2001 | Choi | 700/200 |
| 6,421,571 B1 | * | 7/2002 | Spriggs et al. | 700/17 |
| 6,684,264 B1 | * | 1/2004 | Choi | 710/15 |
| 7,337,409 B2 | * | 2/2008 | Doblmayr et al. | 715/769 |
| 7,480,709 B2 | * | 1/2009 | Callaghan | 709/223 |
| 2003/0001903 A1 | * | 1/2003 | Duffy | 345/810 |
| 2005/0155043 A1 | * | 7/2005 | Schulz et al. | 719/328 |

OTHER PUBLICATIONS

"TOSMAP-DS"; Sep. 10, 2001;pp. 1-10.*
Briggs, Allan; "Multimedia performace support systems for industry"; 1996; Proceedings of the Third International Interactive Multimedia Symposium; pp. 73-79.*
Liu et al.; "Towards automating the creation of hypermedia service manuals by compiling specifications"; 1994; IEEE; Multimedia Computing and Systems; pp. 203-212.*
Jacob et al. ; "A Human-Computer Interaction Framework for Media-Independent Knowledge"; 1998; Department of Electrical Engineering and Computer Secience Tufts Univesrity; American Assocaition for Artifical Intelligence; pp. 1-5.*
"Fluent product user"; Oct. 21, 1991; Network World; International Data Group; vol. 8; No. 42; p. 24.*

* cited by examiner

*Primary Examiner* — Jeffrey A Gaffin
*Assistant Examiner* — Chad Rapp
(74) *Attorney, Agent, or Firm* — Michael F. Krieger; Kirton McConkie (57) ABSTRACT

Embodiments of the present invention comprise methods and systems for training, maintenance, trouble-shooting and repair of machinery and equipment.

20 Claims, 5 Drawing Sheets

METHODS AND SYSTEMS FOR MACHINE-RELATED INFORMATION DELIVERY

RELATED REFERENCES

This application claims the benefit of U.S. Provisional Patent Application No. 60/750,471, entitled "Intellischematics," filed on Dec. 16, 2005 by Brad E. Jensen and Shane W. Lawrence.

FIELD OF THE INVENTION

Embodiments of the present invention comprise methods and systems for delivery of and access to information for the training, maintenance, trouble-shooting, repair and other operations related to machinery and equipment.

BACKGROUND

There is a growing need in industry to improve reliability, training, trouble-shooting, component identification, safety and maintenance for the vast array of manufacturing processes, equipment and machinery needed in today's industrial and modernized world. There is a growing need for skilled employees in these areas as the baby boomer generation retires and replacements having the necessary skills are limited. In recent years, microprocessor technology has allowed the integration of programming logic into various industries, including the fluid-power industry, so that today a computer can be programmed to completely automate the fluid-power and timing functions of a piece of equipment. However, this additional complexity has added to the need for better training methods for those who service or repair these complex pieces of machinery and equipment.

As these machines have developed, schematics were created to keep track of the machine components and functionality. Schematics are used not only to describe how the machine is assembled but also how the different components function together. Schematics may be used in every industry and for every type of machine. Schematic drawings make it possible to show circuit functions when using components from different manufacturers. A 4-way valve or other component from one supplier may bear little physical resemblance to one from a different supplier. Using actual cutaway views of valves to show how a machine operates may be fine for one circuit using a single supplier's valves. However, another machine with different parts may have a completely different appearance. Troubleshooting machines with parts from different manufacturers can require special training and knowledge.

Using schematic symbols requires learning only one set of information for any component. Schematic symbols also may provide more information than a picture of the part. For example, it difficulties impossible to tell which position a 4-way valve is in by looking at a pictorial representation. On the other hand, a 4-way valve symbol and its position on the schematic makes all features immediately clear. Another advantage is that by using schematic symbols and drawings that are in accordance with the International Standards Organization (ISO) format, the drawing can be read by persons from different countries. Directions, notes or material lists may be unreadable because of language differences, but anyone trained in schematic symbols can follow and understand the circuit function. Even though schematics and their symbols are universal in nature, a high percentage of the work force does not know how to read a schematic or translate the schematic symbol to the actual part of the machine to which it refers. This results in billions of dollars of wasted downtime.

SUMMARY

Some embodiments of the present invention comprise methods and systems for providing integrated tools for machine-related information exchange. In some embodiments, machine-related schematics may be integrated with other information such as, digital photos, video, animations, databases and other media comprising machine-related information.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention may relate to machines comprising mechanical, electrical, electronic, hydraulic, pneumatic and other systems. A fluid-power machine may comprise any or all of these systems.

Figure 1:
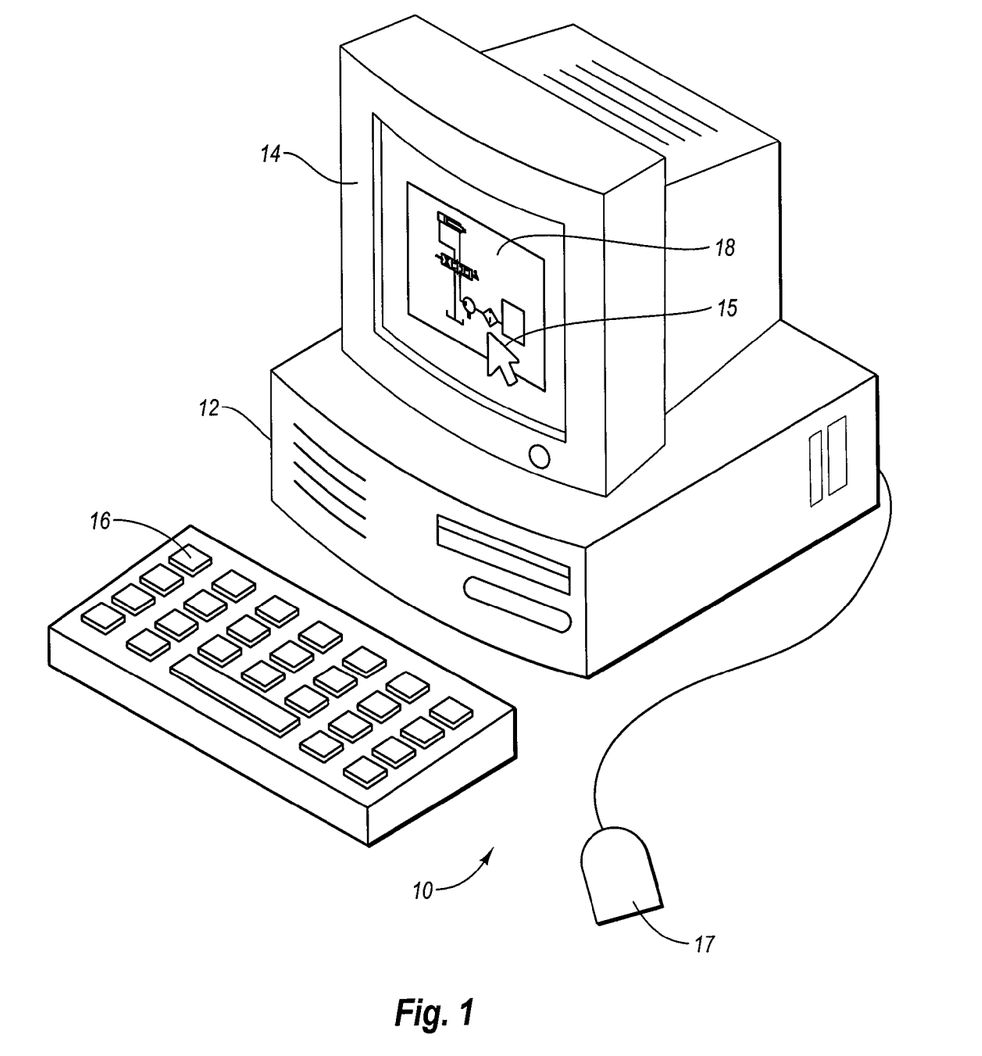
FIG. 1 is a diagram of a typical computer system used in conjunction with embodiments of the present invention.

Some embodiments of the present invention, described with reference to FIG. 1, may comprise visual references displayed on a computer system 10. A computer system 10 may comprise a processing unit 12 connected to a display 14, such as a video monitor or LCD display, on which information is displayed to a user. The computer system 10 may also comprise input devices, such as a keyboard 16 and pointing device 17 used to communicate with system 10 and processing unit 12. Some embodiments may comprise input devices such as a pen stylus or touch screen or other input devices known in the art. System 10 may also comprise a graphical user interface (GUI) which allows for the display of visual representations 18 including, but not limited to, schematics and images, which comprise active regions or hot spots which may be selected by a user through user input, such as via input devices 16 and 17 or by other methods. Known GUIs typically use a mouse or pointer input device 17 to orient a cursor pointer 15 over an icon or portion thereof while making an input device selection such as a mouse or pointer click, double click, touch screen or similar input. Most GUIs also support common drag-and-drop operations and other input techniques known in the art. Some embodiments of the present invention may comprise manipulation of visual references in conjunction with a handheld or laptop computer system wherein the processing unit, display and input device are all integrated into one compact portable unit.

Figure 2:
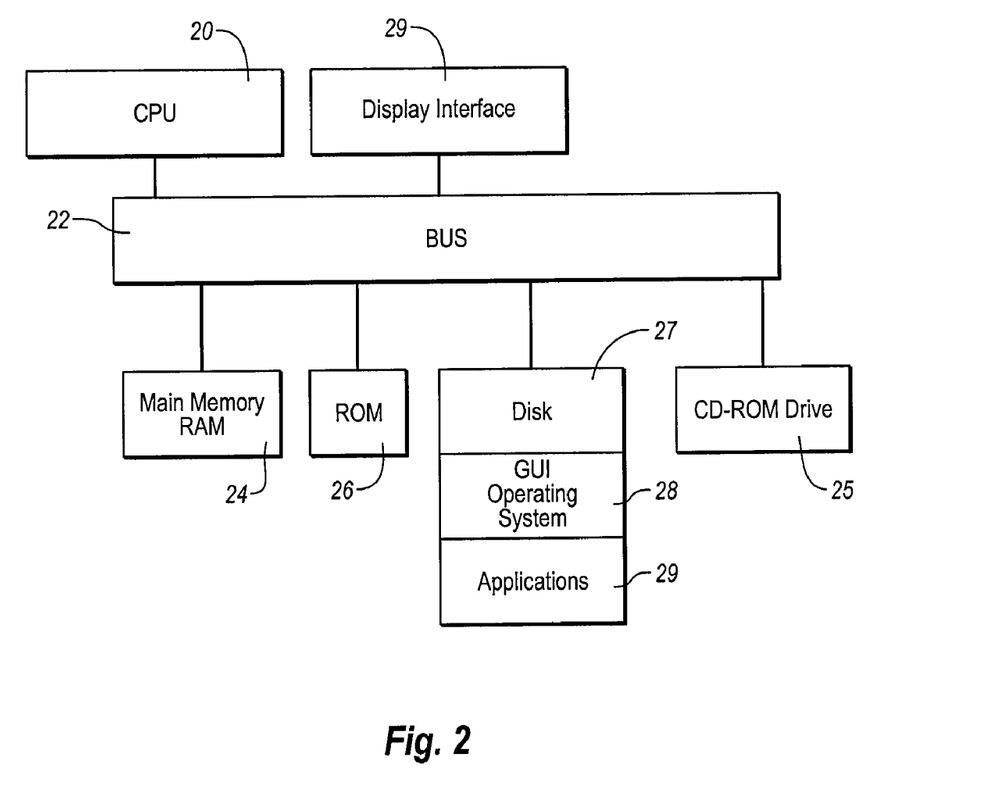
FIG. 2 is a diagram showing the various components of a computing device used in conjunction with embodiments of the present invention.

The architecture of an exemplary computer system 10 may be seen with reference to FIG. 2, which shows a block diagram of system components. While system components may vary widely and many elements may be used in conjunction with embodiments of the present invention, the exemplary embodiment shown in FIG. 2 is typical of a computer system 10 used in the art. System 10 comprises a CPU 20 in communication with a computer bus 22 which connects a CPU 20 with other system components. Also connected to bus 22 is main memory 24 and read-only memory (ROM) 26. System 10 may also comprise storage devices such as a disk drive 27 which may be used to store an operating system 28, applications 29 and other data. In some embodiments of the present invention, an operating system 28 may incorporate a GUI.

Some systems may also comprise other storage devices, such as a floppy-disk drive, CD-ROM drive 25, DVD drive or similar devices. Input devices such as a keyboard 16 and a pointing device 17 may also be connected to a bus 22 for communication with a CPU 20. System 10 may also comprise a display interface 29 for connection with display 14 thereby enabling input through a GUI 28.

In some embodiments of the present invention, a computing device capable of providing the functions of these embodiments may be integrated into a machine for which it provides information. In some of these embodiments, the integrated computing device may perform other machine functions and may be a primary machine component that functions secondarily as a machine information access tool.

Some embodiments of the present invention may relate to a machine event. A machine event may comprise movement of a machine component, an electrical change in a machine component, a hydraulic change in a machine component or some other action related to a machine component. Some exemplary machine events may be pressurization of a hydraulic circuit, opening a valve, or applying voltage to an electrical circuit. In some embodiments, a machine event may comprise multiple machine actions. For example, a machine event may be extension of a robotic arm, which may involve multiple hydraulic, electrical and mechanical processes. In some embodiments, a machine event may also be defined by the controls used to initiate or control the event. For example, an event may comprise the process that occurs when a specific button is pressed or a specific valve is opened. In some embodiments, a machine event may comprise a component failure. In some embodiments, a machine event may be defined by one or more sensor outputs or diagnostic results.

A typical fluid-power system may include instruments such as pressure switches, gauges, flow meters, sensors, transducers and other electrical components which may be used to help monitor the performance of the system. Many of the fluid-power systems in operation today are controlled by a programmable logic controller (PLC). A PLC is a computing device used to control the components of the system. A PLC may comprise a central processing unit or CPU, an input/output system and a control program with instructions and addresses to make the equipment in the control system operate properly. The control program is a computer program stored in the PLC's memory that may instruct the components in the system and acquire system data. Thus, in a PLC-controlled system, the system components may be wired through the PLC and not directly to each other.

PLCs may be controlled by a software program in their memory or a storage device called the control program. A PLC may store all the information regarding the control program and input and output status in its memory or other storage using a system called addressing. An address is a label or number that indicates where a certain piece of information is located in a PLC's memory. Some addresses may contain information about the status of particular devices. Other addresses may contain reference data entered by the system programmer.

Figure 3:
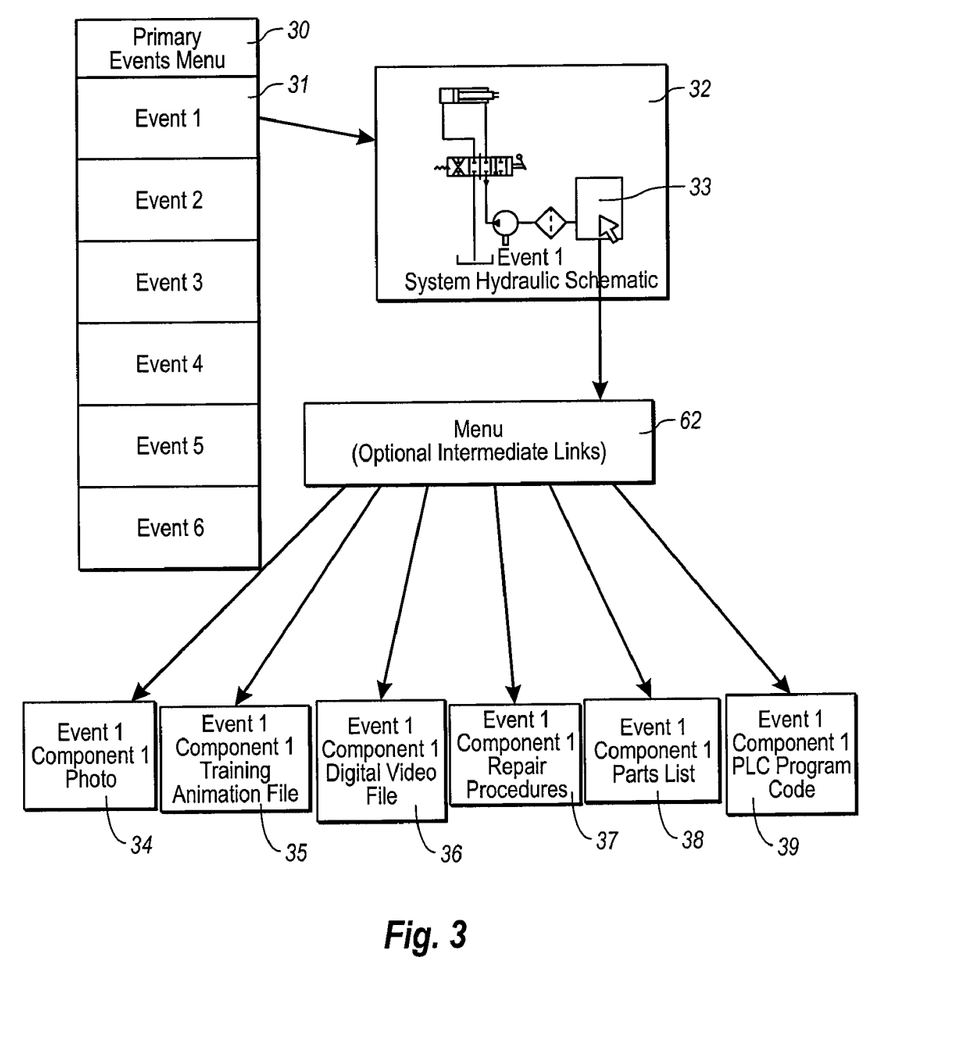
FIG. 3 is a chart showing exemplary embodiments of the present invention comprising an event-specific visual representation with component active region hot spots linked to component specific files.

Some embodiments of the present invention may be described with reference to FIG. 3. In these embodiments, a machine event selection process is presented to a user. Using this process, a user may identify a machine event in which the user has interest. In an exemplary embodiment, the event selection process may comprise an event selection menu 30 displayed through a GUI through which a user may select an area associated with a machine event. In some embodiments, this process may be the main menu of a system.

In some embodiments, the machine event selection menu 30 may be displayed with a digital photograph of the entire piece of machinery or equipment to orient the user to the machine. In some embodiments, a machine event selection process may comprise a column which lists each of the primary events or actions that a machine is capable of performing. Each event that the machine performs may require a different position and status for the system components such as cylinders, pumps, valves, fluid and electronics. Each event that the machine can perform may therefore require a different set of schematics and files linked to that event to show the operating details of all of the system components during that event. The column may be located on the left side of the page or may be located anywhere the user would prefer. This page may also include a symbol or trademark of the company for which the training has been developed. It may also include a hyperlink to the training developer's website.

In some embodiments of the present invention, the user may choose an event or action that the machine is capable of performing. When the user selection of the event is received 31, an event-specific visual representation of the machine may be displayed 32. The event-specific visual representation may comprise a hydraulic schematic, an electrical schematic, a blueprint or machine diagram, a machine image or some other visual representation of the machine or its components as they relate to the selected event.

In some embodiments of the present invention, the visual representations or schematics may be color coded to demonstrate the state or condition of fluids in the system during the selected event. In some embodiments, the visual representation may use red lines and symbols to represent fluid pressures. Yellow may be used to represent reduced flow, orange for reduced pressure, green for suction and blue for return.

In some embodiments of the present invention, the event-specific visual representation may comprise component symbols, such as hydraulic schematic symbols, electrical schematic symbols or other symbols that relate to the machine and its components. These symbols may comprise active regions or "hot spots" that respond to user input. A hot spot may comprise an embedded link to audio, video, image or other types of computer files that correspond to that particular component represented by the symbol. In some embodiments of the present invention, a user may select 33 a hot spot associated with a specific component on the event-specific visual representation. This selection may link to and display digital photographs 38, animation training files 35, digital video files 36, component repair procedures 37, component parts list 38, programmable logic controller (PLC) program code or address data 39, diagnostic processes or other information. This linked information may show the component and the surrounding context of the equipment in greater detail during the event selected during event selection.

If a user were to select a different event 30, a different event-specific visual representation, corresponding to that selected event, may be displayed showing the status and condition of the system components during that selected event. The component "hot spots" on the schematic may then comprise embedded links to audio, video, image or other types of computer files that correspond to and show the status and condition of that particular component during the selected event.

Some embodiments of the present invention may also offer a choice of links to commonly used schematics, data and functions for experienced users. Some embodiments may also comprise instructional links for new or less experienced users. Each screen may also have a back feature to move from the current screen to the previous screen, in this way leaving the user with no dead ends. In some embodiments, regardless of which training course is being used, all applications and information shown and all files used in the program may utilize the same presentation format and template which may be customized to include logos and other material from third party vendors who may wish to utilize the program for their own corporate use.

In still further embodiments of the present invention, a visual representation may contain active regions or hot spots which may link to additional information such as item numbers, client and manufacturer's part numbers, manufacturer data, electrical data, etc. The visual representation may also include hot spots to safety tips for operating, testing or repairing the respective component or hot spots to maintenance logs and other documentation where the user may keep a running log of maintenance procedures, problems, remedies and other documentation of the respective component. In some embodiments which have extended network access or Internet access, machine components may be ordered from a manufacturer website.

In some embodiments, the machine event selection menu 30 and other display pages or elements may contain active regions or hot spots that respond to user input by displaying pull-down menus showing links and options available to the user.

In some embodiments of the present invention, a display comprising the machine event selection menu 30 may also comprise a choice of thumbnail-style summaries for training modules to allow users to jump right to the schematic or image they need without having to drill into multiple hot spots on multiple screens.

In other embodiments of the present invention, a visual representation may comprise a schematic with hot spots which may link to digital images of the system components which, in turn, may contain hot spot links to digital audio, video and animation files which show information related to the specified component. The specified component that is being demonstrated may be circled or marked in some other fashion to make it obvious which component in the image is being demonstrated as well as its location on the machine. In some embodiments, a narrator may explain the details and precisely what the user is seeing as the animation demonstrates what the component does and how it functions. In some embodiments of the present invention, the animation file may be substituted with a digital video file of an actual component in operation. These files may comprise, but are not limited to, JPEG, MPEG, AVI, WAV, and other formats. In some embodiments, a digital media file may be embedded directly into a Portable Document Format (pdf) document comprising the machine event selection program 30. The technical documentation and digital files included within the machine event selection program 30 may be quickly accessed via visual-drill-down techniques and pull-down menus to specific component sections of the documentation, as required for a given training course or repair procedure. These features offer easy guided access to specific technical information to improve the accuracy and efficiency of repairs, improve reliability and reduce equipment downtime. Some embodiments may communicate data and information in a multimedia format for communicating and displaying the large amount of data associated with the training, repairing and maintaining of fluid-powered machinery and other complex equipment.

Figure 4:
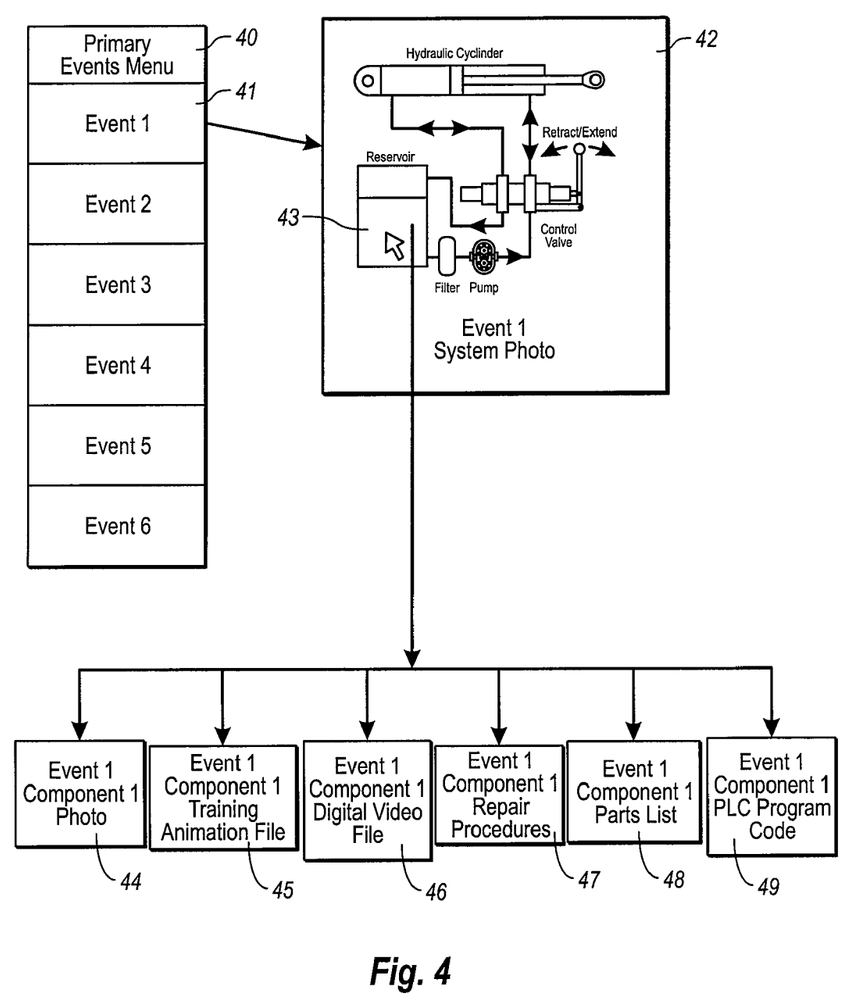
FIG. 4 is a chart showing exemplary embodiments of the present invention comprising a system photos with component hot spots linked to component specific files.

Some users may be more comfortable working with photos of the equipment rather than schematics. In some embodiments of the present invention, described with reference to FIG. 4, A machine event selection menu may be displayed 40 showing a menu of possible actions or events the equipment is capable of performing. When a user performs a selection 41 from the menu, an event-specific image 42 of the machine may be displayed. In some embodiments, a digital photo of the machine system 42 showing machine components 43 as they are positioned and configured for the selected event may be displayed. This event-specific image may comprise active region hot spots associated with individual machine components 43. In some embodiments, a user may select a hot spot associated with a component 43 on the system image 42. The hot spot may link to and display event-specific, component digital photographs 44, event-specific, component animation training files 45, event-specific, component digital video files 46, event-specific, component-specific repair procedures 47, component parts list 48, event-specific, component-specific PLC program code or address data 49 or other event-specific, component digital media, which may show the component and the surrounding context of the equipment in greater detail during the event selected during machine event selection.

Figure 5:
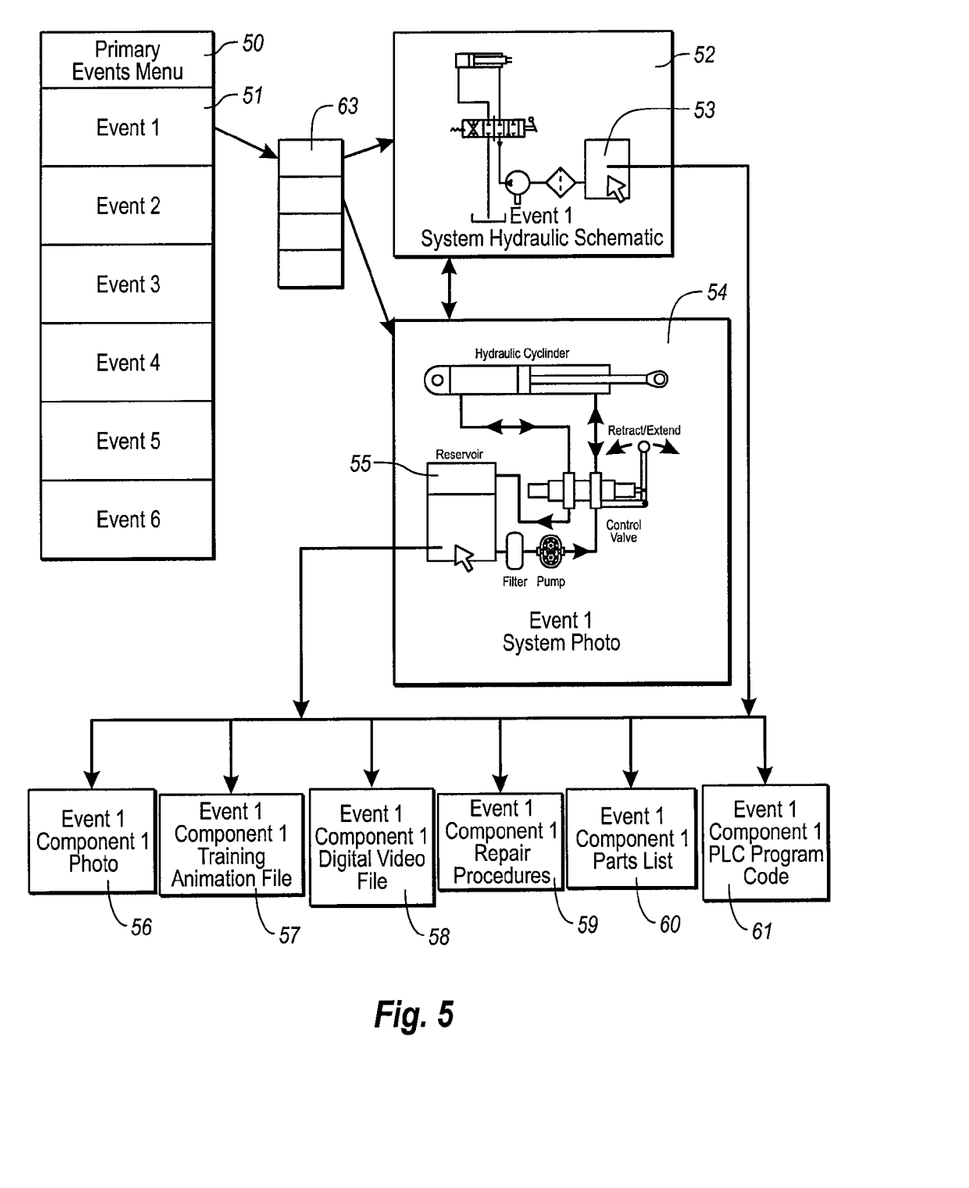
FIG. 5 is a chart showing exemplary embodiments of the present invention comprising multiple event-specific visual representations with component hot spots linked to component specific files.

In some instances, depending on the type of equipment and the skill level of the user, it may be beneficial to learn by using machine images, diagrams, schematics and other visual references interchangeably. In some embodiments of the present invention, described with reference to FIG. 5, A machine event selection menu may be displayed 50 showing a menu of actions or events related to a machine. In these embodiments, an additional graphical preference menu may be displayed 63 from which a graphical preference selection may be made.

From this graphical preference menu, a user may select a digital image of the machine, a machine hydraulic schematic, a machine electrical schematic, a machine diagram, a multi-dimensional machine model representation, a cut-away view of the machine, or some other visual representation of the subject machine. In some embodiments, a default graphical preference will be used and the default visual representation may be displayed while a user is presented with a graphical preference menu and is given the option to select other visual representations. In an exemplary embodiment, shown in FIG. 5, a user may select either a hydraulic schematic 52 or a system photo 54, both of which feature system components either schematically 53 or photographically 55. Both the schematic and the photo displayed are event-specific and will depict the machine during the event selected with the machine event selection menu. These alternate visual representations may comprise active region hot spots associated with the individual machine components 53 & 55. In some embodiments, a user may select a hot spot 53 associated with a component on the system hydraulic schematic or may select a hot spot 55 associated with a component on the system photo. These hot spots may link to and display component photographs 56, animation training files 57, digital video files 58, component repair procedures 59, component parts list 60, PLC program code or address data 61, diagnostic processes, part ordering processes or other functions. In some embodiments, these links may show the component's status, condition, position and the surrounding context of the equipment in greater detail during the event chosen through the machine event selection process.

Embodiments of the present invention provide an improvement in the training, diagnosis, repair and maintenance of hydraulic machinery and other equipment by applying computer-based technologies to replace or augment the prior manual, paper-based processes. This will result in improved reliability and increased productivity by reducing the downtime of machines and equipment through more efficient and focused repair, maintenance, training and other processes.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for providing computer-based, machine-related information through a computing device, said method comprising:
    storm an event-specific schematic of a machine for each of a plurality of events that the machine can perform, the machine including a plurality of components, each event-specific schematic including representations of the components, the representations being customized based on the state of the components while the machine is performing the corresponding event;
    displaying, to a user on a display device, a representation of each of the plurality of events;
    receiving, from the user, a selection of are representation corresponding to a first event of the plurality of events;
    identifying, from among the plurality of event-specific schematics, a first event-specific schematic that represents the state of the machine when the machine is performing the first event;
    displaying the first event-specific schematic, wherein the representations of the components displayed in the first event-specific schematic are selectable thereby allowing the user to select to view additional information regarding a selected component, the additional information representing the state of the selected component during the first event;
    receiving, from the user, a selection of a representation of a first component; and
    displaying the additional information regarding the state of the first component during the first event.

2. The method as described in claim 1 wherein the additional information regarding the state of the first component comprises a photograph of an actual implementation of the machine, the photograph identifying the first component in the machine when the first event occurs in the actual implementation of the machine.

3. The method as described in claim 1 wherein the additional information regarding the state of the first component comprises a video of an actual implementation of the machine, the video identifying the first component in the machine when the first event occurs in the actual implementation of the machine.

4. The method as described in claim 2, wherein the photograph is selectable, the method further comprising:
    receiving a user selection of the photograph; and
    displaying a virtual video representation of how the first component functions during the first event.

5. The method as described in claim 1 further comprising:
    receiving, from the user, a selection of a representation corresponding to a second event of the plurality of events;
    identifying, from among the plurality of event-specific schematics, a second event-specific schematic that represents the state of the machine when the machine is performing the second event;
    displaying the second event-specific schematic, wherein the representations of the components displayed in the second event-specific schematic are selectable thereby allowing the user to select to view additional information regarding a selected component, the additional information representing the state of the selected component during the second event;
    receiving, from the user, a selection of a representation of a first component in the second event-specific schematic; and
    displaying the additional information regarding the state of the first component of the second event-specific schematic during the second event.

6. The method as described in claim 5, wherein the first component of the first event-specific schematic is the same as the first component of the second event-specific schematic, wherein the additional information displayed regarding the state of the first component comprises a photograph, and wherein the photograph displayed to represent the first component during the first event is different than the photograph displayed to represent the first component during the second event.

7. The method as described in claim 1, wherein the additional information is selectable, the method further comprising:
    receiving a user selection of the additional information; and
    displaying multimedia content that describes how the first component functions during the first event.

8. The method as described in claim 7, wherein the multimedia content comprises one of:
    a video providing a virtual representation of how the first component functions during the first event;

an audio presentation that describes how the first component functions during the first event; or
one or more photographs showing how the first component functions during the first event.

9. The method as described in claim 1, wherein the machine is one of an electric, electronic, hydraulic, pneumatic, or mechanical machine.

10. The method as described in claim 9, wherein the machine is an mechanical machine, and wherein the first event comprises the physical movement of the first component which performs at least a portion of the first event.

11. The method as described in claim 9, wherein the machine is an electrical machine, and wherein the first event comprises a change in an electrical value of the first component that causes at least a portion of the first event to occur.

12. The method as described in claim 9, wherein the machine is a hydraulic machine, and wherein the first event comprises the pressurization of the first component.

13. The method as described in claim 1, wherein the machine comprises one or more of electric, electronic, hydraulic, pneumatic, or mechanical components.

14. A method for providing training to a user regarding the state of various components of a machine during a plurality of events, the method comprising:
storing an event-specific schematic of a machine for each of a plurality of events that the machine can perform, the machine including a plurality of components, each event-specific schematic including representations of the components, the representations being customized based on the state of the components while the machine is performing the corresponding event;
displaying, to a user on a display device, a representation of each of the plurality of events;
receiving, from the user, a selection of a representation corresponding to a first event of the plurality of events;
identifying, from among the plurality of event-specific schematics, a first event-specific schematic that represents the state of the machine when the machine is performing the first event; and
displaying the first event-specific schematic, wherein the representations of the components displayed in the first event-specific schematic are selectable thereby allowing the user to select to view one or more photographs of a physical implementation of the selected component in a physical implementation of the machine when the first event occurs.

15. The method of claim 14, the method further comprising:
in response to a user selection that selects a representation of a first component, displaying a photograph that identifies a physical implementation of the first component in a physical implementation of the machine, the physical implementation of the first component having the state of the first component during the first event.

16. The method of claim 15, wherein the photograph that identifies the physical implementation of the first component is also selectable.

17. The method of claim 16, further comprising;
in response to a user selection of the photograph, displaying a video that illustrates a virtual representation of how the first component functions during the first event.

18. The method of claim 15, further comprising:
receiving, from the user, a selection of a representation corresponding to a second event of the plurality of events;
identifying, from among the plurality of event-specific schematics, a second event-specific schematic that represents the state of the machine when the machine is performing the second event;
displaying the second event-specific schematic, wherein the representations of the components displayed in the second event-specific schematic are selectable thereby allowing the user to select to view additional information regarding a selected component, the additional information representing the state of the selected component during the second event;
receiving, from the user, a selection of a representation of a first component in the second event-specific schematic; and
displaying a photograph that identifies a physical implementation of the first component in a physical implementation of the machine during the second event.

19. The method of claim 18, wherein the first component in the first and second event-specific schematics is the same component, and wherein the photograph displayed for the first event shows the first component in a different state than the photograph displayed for the second event.

20. The method of claim 19, wherein the different state comprises a different physical position of the first component with respect to the physical machine.

* * * * *

UNITED STATES PATENT AND TRADEMARK OFFICE
CERTIFICATE OF CORRECTION

PATENT NO. : 8,401,675 B2  
APPLICATION NO. : 11/611698  
DATED : March 19, 2013  
INVENTOR(S) : Brad E. Jensen and Shane W. Lawrence It is certified that error appears in the above-identified patent and that said Letters Patent is hereby corrected as shown below:

On the Title Page: item (56) Other Publications Line 10 - 11,
"Computer Secience Tufts Univesrity; American Assocaition for Artifical Intelligence;" should read
"Computer Science Tufts University; American Association for Artificial Intelligence;"

In the Claims:

In column 7, line 50, "storm" should read "storing"

In column 7, line 59, "are representation" should read "a representation"

Signed and Sealed this
Sixth Day of August, 2013

Teresa Stanek Rea
*Acting Director of the United States Patent and Trademark Office*